United States Patent

[11] 3,596,274

[72] Inventor Eberhard P. E. Heringhaus
 Pfungstadt, Germany
[21] Appl. No. 8,844
[22] Filed Feb. 5, 1970
[45] Patented July 27, 1971
[73] Assignee Uniroyal Englebert Deutschlang AG
 Aachen, Germany
[32] Priority Feb. 7, 1969
[33] Germany
[31] P 19 05 994.0

[54] PROCESS AND APPARATUS FOR TESTING FILAMENTARY WEBS
 6 Claims, 3 Drawing Figs.

[52] U.S. Cl. .............................................. 346/1,
 346/33F, 250/219 DF, 356/200
[51] Int. Cl. ..................................................... G01n 21/32,
 G01d 5/26
[50] Field of Search........................................ 346/33 F,
 33 A, 1; 250/219 WE, 219 DF, 219 S; 356/200,
 199, 237, 238; 73/159

[56] References Cited
UNITED STATES PATENTS
2,909,660 10/1959 Alexander..................... 250/52
3,410,643 11/1968 Jorgensen..................... 356/200
3,479,518 11/1969 Akamatsu et al. ............ 250/219 DF FOREIGN PATENTS
268,653 12/1964 Australia...................... 346/33 F Primary Examiner—Joseph W. Hartary
Attorney—Norbert P. Holler ABSTRACT: The quality of filamentary multistrand webs of sheet material, such as weftless tire cord fabric, is determined by moving the web longitudinally of itself over a full width elongated light source while scanning a photoelectric transducer reciprocally across the opposite surface of the web to provide an output which varies in accordance with transmitted light density variations. A marking pen of a strip chart recorder is reciprocally traversed across the chart in synchronism with the traversing movements of the transducer, and the chart is longitudinally advanced stepwise for a predetermined short distance each time the transducer reverses direction. The output of the transducer is integrated to eliminate the influence of single strands entering and leaving the field of view of the transducer, and the integrated signals are used to control the displacements of the pen in the longitudinal direction of the chart. The result is a graphic picture of the web which may be used as a permanent record of its quality and characteristics.

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

INVENTOR.
EBERHARD P.E. HERINGHAUS
BY Norbert P. Holler
ATTORNEY

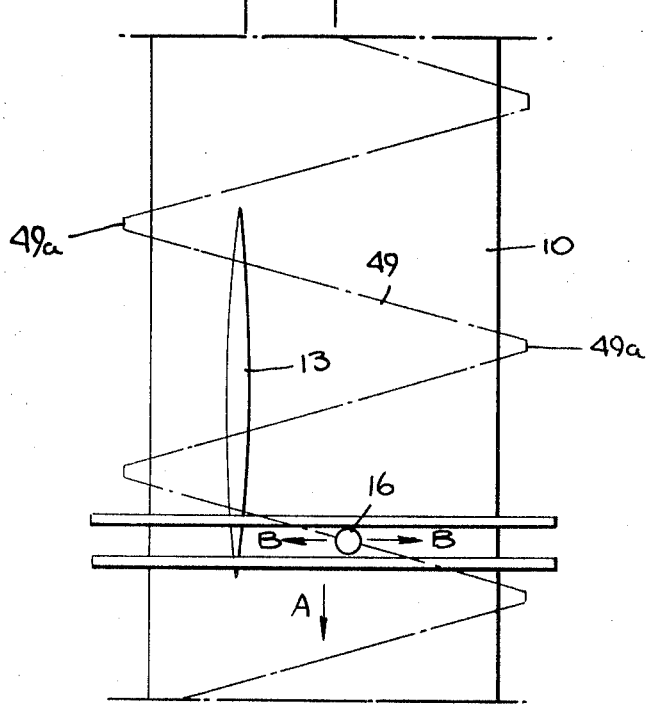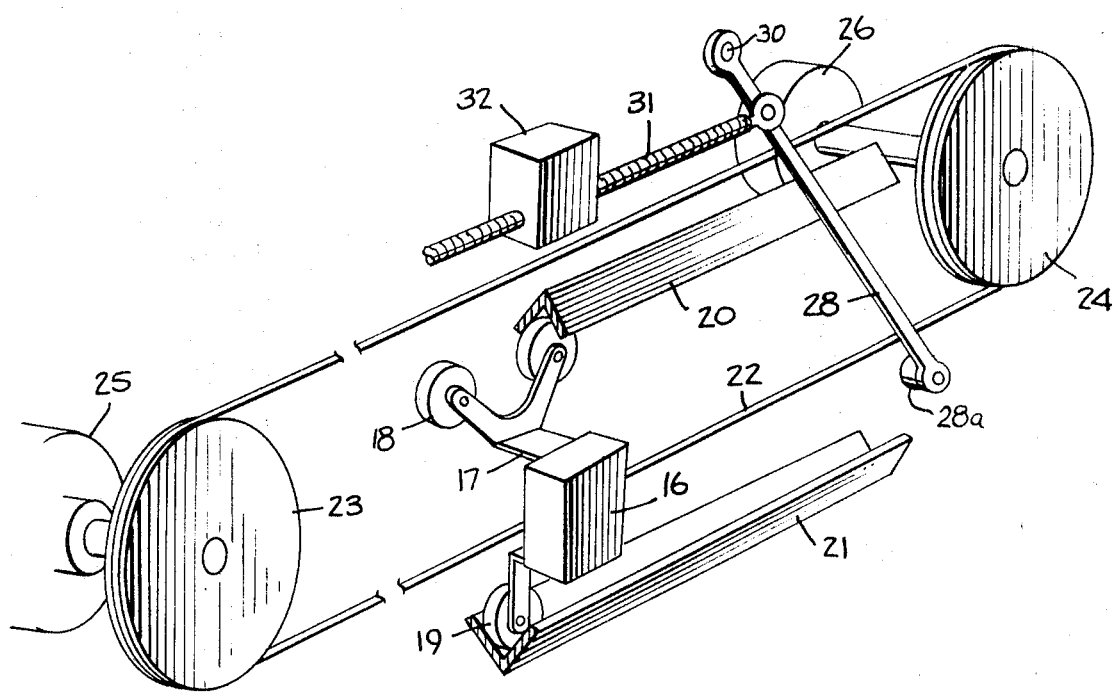

PROCESS AND APPARATUS FOR TESTING FILAMENTARY WEBS

This invention relates to the art of testing of filamentary multistrand webs for the quality thereof, and in particular to determine the presence or absence of certain types of defects in such webs.

As is well known, in the manufacture of pneumatic tires, plies of filamentary strands (cables, cords, filaments, etc., of both textile and nontextile materials, e.g., rayon, nylon, polyester, glass fiber, steel wire, and the like, arranged in the form of rubberized or rubber-coated webs (known in the art as "weftless tire cord fabric"), are used for the construction of the carcass and for the reinforcement of parts of the tread or of the beads. In such cord fabric, the strands or warps are interwoven with relatively few weft threads which are normally much thinner than the warps and serve essentially only to hold the warps together during the treating of the webs preparatory to the calendering of the rubber thereto. Essentially, therefore, tire cord fabric (which, it should be noted, may also be used as reinforcement for such other articles as belting, hose, containers, etc.) is characterized by a plurality of endless filaments or strands which are relatively loosely united in close, parallel, side-by-side relation with each other. The lateral distance between adjacent individual cords generally is equal to about one-half to 1 times their thickness, and cord fabric webs as delivered are on the average 1.50 meters in width and may be as much as 3,000 to 4,000 meters in length. Cord fabric is customarily delivered to the tire manufacturer in rolls and is drawn off the rolls in the tire factory to be run through an impregnating bath, one or more drying stages, and the rubberizing calender, before being forwarded to the tire building stations. In the course of these operations, which may entail a plurality of intermediate steps as well, the fabric may be repeatedly wound or unwound, or stretched, or subjected to other special treatments. Thus, in going through these operations, the fabric is exposed again and again to relatively severe stresses, which in an undesirable manner tends to impair and rupture the weak transverse interconnections of the warp strands formed by the weft threads.

The resultant defects observable most frequently are strand deviations, e.g. bunching or overlapping of the strands in the marginal zones of the web, as well as strand separations in the inner portions of the web, all effectively due to the rupture of weft threads. Quite apart from this, there is a natural susceptibility of the fabric webs, when wound in rolls, to the occurrence of the aforesaid defects as a result of internal forces. Such strand deviations frequently extend over relatively long stretches of the individual fabric webs. It may happen also that during impregnation, the fabrics are soiled or rendered sticky by insufficiently dissolved substances. Such defects, in contrast to the mentioned strand deviations, usually spread like stains over the fabric web.

It is an important object of the present invention, therefore, to provide a method of and apparatus for inspecting such webs, and especially cord fabric, continuously during the manufacturing and/or processing thereof in order to ensure that defects can be discovered easily and the respective web parts eliminated from further use.

A particular object of the present invention is the provision of a suitable web testing method which is applicable both to the running control of the production of the web and to the execution of spot checks thereon by a prospective user, and which, with reference to the normal spacing of the individual strands from each other in cord fabric webs, will give information with sufficient accuracy on abnormal strand spacings, i.e. bunchings or overlaps and larger than usual separations.

Generally speaking, the objectives of the invention are attained by virtue of the fact that the intensity of light passing through the web and emanating from a full width light source located at one surface of the web, is sensed linearly by a photoelectric transducer, e.g. a photocell, at the other surface of the web over a traveling small area several strands wide, and that subsequently the corresponding electrical signals are integrated, with the resultant output being used for the control of an indicating device or recorder. The field of view of the photoelectric transducer can be so selected as to its size (on the average it will be punctiform and extend over 3 to 4 strands lying side-by-side) that web defects of the order of magnitude to be indicated can be detected with certainty. With appropriate setting of the dark current of the photoelectric transducer, the working point of the same or the brightness of the light source may be so adjusted, as a function of the light absorption capacity of the raw or impregnated web (which may differ from web to web, depending on the material such as rayon, nylon, polyester, glass fiber or steel, of which the web is made), that the residual light transmitted in the scanning region and not absorbed by the web strikes the transducer in the most sensitive part of its characteristic curve. In the method of this invention, therefore, the influence of single strands, i.e. the effect of the entry of each individual strand into and the departure thereof from the scanning region or field of view, is eliminated by the integration, so that only the mean light intensity variations occurring in the scanning region are sensed. Thus, as the web is scanned, sharp voltage pulses corresponding to the individual strands are not obtained, but rather a smoothing of the signal output by the integration, whereby rarifications or densifications in the web which are greater than normal are indicated.

Advantageously, with the light source extending over the full width of the web and preferably somewhat beyond the marginal boundaries thereof, the photoelectric transducer is displaceable in alignment with the light source along a guide track at the opposite ends of which switch operating means are provided, each of which, upon actuation, is effective to reverse the direction of rotation of a motor which displaces the photoelectric transducer. The latter is moved back and forth crosswise to the feed direction of the web during the advance of the latter, so that the web is scanned in a zigzag pattern. The output signals from the transducer are fed, if desired via an amplifier, to an integration network. The speed of movement of the transducer can be so adjusted in relation to the feed velocity of the web that, according to the particular requirements, either a wide or a close scanning is effected. In this connection it is to be noted that the method of the present invention is essentially designed for the practice of a spot check type of inspection which generally does not encompass the entire expanse of the web to be tested, but which instead proceeds over the web in the fashion of a zigzag line in such a manner that sufficient numbers of representative test points at every given distance from the median line of the web are covered. The method can serve primarily for providing statistical guide values and to furnish an indication of the average character or quality of the web at hand.

According to a particular aspect of the present invention, the recording device of the apparatus is preferably an orthogonal coordinate or X—Y recorder utilizing a web-simulating strip chart as the record medium and provided with means permitting the recording of the web characteristics in the form of a trace which is continuous over the entire time of the inspection run. To this end, drive means are provided at the recorder to act on the record medium in the X direction so as to shift the Y coordinate correspondingly. Advantageously, this drive means comprises a stepping motor which so acts on the feed sprocket for the record medium that it advances the latter, after each traverse of the transducer, by a certain freely adjustable step in the X direction. The actuating pulses for the stepping motor can be derived from the same switch arrangement which controls the movement reversals of the photoelectric transducer at the end points of the scanning path.

The foregoing and other objects, characteristics and advantages of the present invention will be more clearly understood from the following detailed description thereof when read in conjunction with the accompanying drawings, in which:

FIG. 2 is a fragmentary perspective view, on an enlarged scale, of the transducer scanning mechanism of the apparatus shown in FIG. 1; and FIG. 3 is a diagrammatic illustration of the scanning process according to the present invention.

Figure 1:
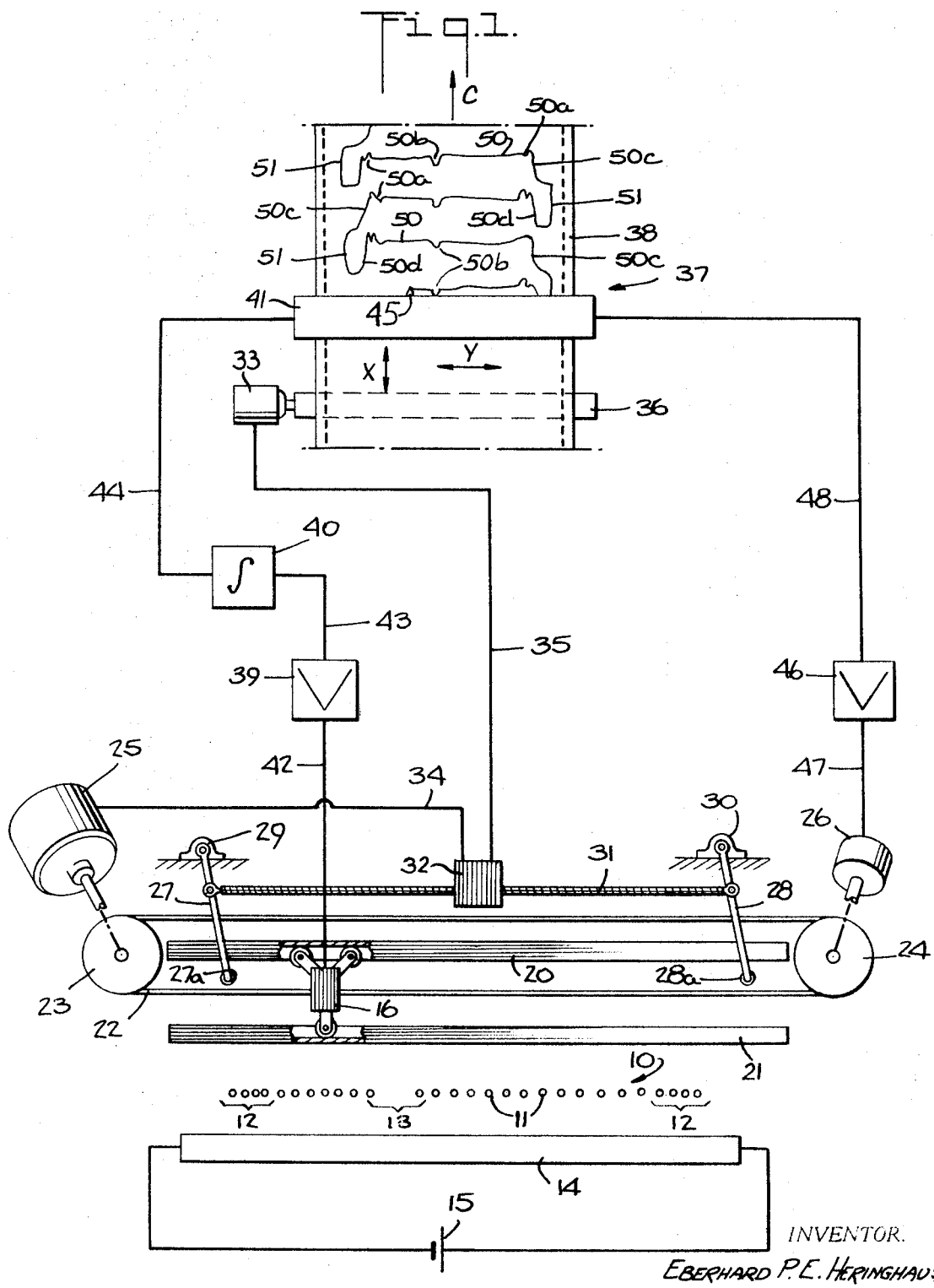
FIG. 1 is diagrammatic and schematic illustration of a web testing apparatus according to the present invention.

Referring now to the drawings in greater detail, a web 10 of the type to be tested or inspected in accordance with the principles of the invention, for example a tire cord fabric, generally consists of a plurality of parallel individual strands 11 which are held together by transverse, relatively weak wefts (not shown). Merely for purposes of illustration, the web 10 is shown as having two types of strand deviations, to wit, a more than normal bunching or crowding of the strands, designated by the numeral 12, at each of the lateral marginal edge regions of the web, and a more than normal spreading or separation, designated by the numeral 13, at an inner region of the web. It will be understood, of course, that any given web may have other such strand deviations at various locations, for example one or more additional bunchings or separations of the strands, as well as other faults such as overlaps of adjacent strands, uneven impregnations, etc., all of which will have the tendency to vary the light transmission characteristics of the web accordingly. In FIG. 3, there is illustrated in the form of an elongated gap only the strand separation 13 which may be as much as several hundred meters long and as much as a few centimeters wide.

The web testing apparatus according to the present invention comprises an elongated linear light source 14 (FIG. 1), e.g. a fluorescent lamp or an equivalent bank of shorter light bulbs, disposed below the path of movement of the web 10 and at right angles to its longitudinal dimension and direction of movement. The light source 14 should be characterized by a high degree of uniformity of the luminous density of the light incident on the web. The light source is arranged to be energized by a suitable direct current voltage source 15 (the use of a DC voltage source, it will be noted, is desirable to avoid any AC frequency modulation of the light intensity) and is advantageously housed in a box (not shown) in which a light-passing elongated aperture a few centimeters wide is provided on the side facing the location of the web. In this manner, the surroundings of the testing station are effectively shielded from stray or scattered light.

Arranged opposite the light source 14 and on the other side of the path of movement of the web 10 is a photoelectric transducer 16, e.g. a photocell, which is firmly connected with a small carriage 17. The latter is mounted with the aid of wheels 18—19 for linear reciprocal movement in a two-part guide track 20—21 which, like the light source 14, is arranged at right angles to the direction of travel of the web 10. The carriage 17 is connected with an endless cable or belt 22 which is guided adjacent both ends of the guide track 20—21 over a pair of pulleys 23 and 24, the former of which is mechanically coupled with a reversible motor and reducing gear unit 25 for driving the carriage 17 along the track. The other pulley 24 is mechanically coupled with the wiper of a rotary potentiometer 26 having a plurality of turns.

The apparatus further includes, intermediate the pulleys 23 and 24 and adjacent the opposite ends of the track 20—21, a pair of levers 27 and 28, which are pivotally mounted at 29 and 30, respectively, and are connected with one another by a cable 31, for example a Bowden wire, extending parallel to the straight reaches of the photocell-driving cable 22. The levers 27 and 28 are provided with suitable abutment elements, such as rollers 27a and 28a, adapted to be engaged in a manner not explicitly illustrated, either by corresponding abutment means or like adjuncts of the carriage 17, or by abutment means or adjuncts of the photocell 16, as the latter reaches the respective opposite ends of its path of travel. The cable 31 passes through and mechanically effects the shifting of a central switch arrangement 32, preferably a multiple contact mercury switch, the circuit connections of which (not shown since they will be readily apparent to those skilled in the art) are arranged to control the activation of the drive motor 25 and a stepping motor 33, as indicated schematically by the lines 34 and 35, respectively. The stepping motor 33 is drivingly coupled to the chart-advancing sprocket shaft 36 of a suitable X—Y recorder 37 utilizing a strip chart 38 as the record medium. The output signals of the photocell 16 are applied via a suitable conventional amplifier 39 and integrator 40 to the scribing mechanism 41 of the recorder 37, as schematically indicated by the lines 42, 43 and 44, to control the movements of the marking stylus or pen 45 of the recorder in the X-direction. Concomitantly, the output signals of the potentiometer 26 are also applied via an amplifier 46 to the scribing mechanism 41, as indicated schematically by the lines 47 and 48, to control the movements of the pen 45 in the Y-direction.

In operation, it will be apparent that as the carriage 17 and photocell 16 are being moved in one direction or the other along the track 20—21, whenever the respective one of the levers 27 and 28 is contacted and shifted out of its normal rest position upon the carriage 17 reaching the respective end region of the guide track, the central switch arrangement 32 is activated correspondingly to cause a suitable electrical control circuit to effect a reversal of the direction of rotation of the drive motor 25 and pulley 23. The photocell 16 thus is guided back and forth over the path of movement of the web 10 and scans the surface of the web in an effectively zigzag pattern, indicated by the dot-dash line 49 in FIG. 3, the "-pitch" of which is determined, as will be readily understood, by the feed velocity of the web in the direction of the arrow A and the scanning velocity of the photocell at right angles thereto in the direction of the arrows B-B. The dwells of the photocell 16 at the opposite ends of its path of travel, indicated in exaggerated form at the reversal points 49a of the line 49, are caused by the delays inherent in the reversals of the levers 27 and 28, the switch arrangement 32 and the drive motor 25. Any change of the velocity of either the web 10 or the photocell 16, of course, will lead to a variation of the steepness or pitch of the scanning line 49 and can be effected as needed.

The actual scanning of the web 10 by the photocell 16 is punctiform, that is, the field of view of the photocell is a circular area of about 6 mm. in diameter, in which, at normal strand positions, approximately four strands lie in parallel side by side relation. The light passing through this area strikes the photocell in the steepest region of its characteristic curve, i.e. in the region where smallest intensity variations result in the greatest variation of the output signal. Accordingly, when the web is being scanned and the strand spacing is normal, there is formed at the output 42 of the photocell at first a weakly sinusoidal signal, depending on how the individual strands 11 enter and leave the punctiform scanning area. With this signal being supplied to the amplifier 39 and thence to the integration network 40, which first filters out the wave component of the signal corresponding to normal strand position, there appears at the output of the integrator a voltage or signal which corresponds to the mean intensity of the light stream that has entered the photocell. This output signal changes upon occurrence of any deviation in the strand arrangement, for example in such a way that a voltage drop appears in the output when the strand density increases due to a crowding or bunching 12 (such as usually occurs at the edges of the web) and that a voltage rise appears upon a decrease of the strand density due to an abnormal spreading or spacing 13. The output signal is applied to the scribing mechanism 41 of the X—Y recorder 37 and in particular to a deflection part for the abscissa or X coordinate. In addition, as the photocell is traversed across the web 10, the concomitant adjustment of the potentiometer 26 provides an output signal at 47 which represents the various instantaneous positions of the photocell. This output signal, upon amplification, is applied to a deflection part for the ordinate or Y coordinate in the scribing mechanism 41.

In this manner, therefore, during each traverse of the photocell 16, the strand density of the web 10, represented by the photocell output signals, is continuously recorded on the tape or chart 38 as a function of the photocell position, represented by the output signals of the potentiometer 26. Accordingly, in order to supplement this two-component recording so as to provide a complete representation of the scanning path of the photocell as the latter moves back and forth over the web, the chart or tape 38 is advanced by a small step in the direction of the arrow C (FIG. 1), and correspondingly shifts the location of the Y coordinate, at each reversal of the direction of movement of the photocell. As a result, as indicated in FIG. 1, the trace produced on the chart is a continuous line composed of generally parallel horizontal transverse sections 50 which, at the sides of the chart, are connected in an alternating sequence by generally vertical sections 51 representing the feed movements of the chart under the action of the sprocket shaft 36.

It will be seen that the trace 50—51 accurately reflects the state of the web 10. Thus, the irregularities 50a recognizable in the opposite end regions of each of the horizontal trace sections 50 correspond to the bunched strand regions 12 of the web, while the blips 50b indicated in the medial region of each trace section 50 correspond to the abnormal strand separation 13. The sharp drop 50c at the trailing end of each trace section 50 represents the sudden increase of light incident on the photocell 16 when the same moves out of the scanning zone, i.e. beyond the edges of the web 10, while the sharp rise 50d at the leading end of each trace section 50 represents the sudden decrease of light incident on the photocell when the same moves into the scanning zone, all of which takes place as the photocell is located at the reversal sections of its travel.

It will be understood from the foregoing that the graph thus obtained provides valuable statistical information about the quality of the web 10 and, in the illustrated form, particularly about the character of the transverse arrangement of the longitudinally extending strands 11 thereof. In effect, the graph is a pictorial representation of the web, even though, as can be seen from FIG. 3, the surface of the web is not scanned in its entirety but only in the pattern indicated by the zigzag line 49. Such an extract of the web detail, with both the magnitude and quantity of faults as well as their location being shown, actually suffices as an expression of the quality of the web as a whole. It is inherent in the nature of the invention, of course, that this information can be made as detailed and precise as desired. For example, by increasing the number of sweeps of the photocell per unit length of the web, either by increasing the speed of the carriage 17 or by reducing the speed of travel of the web, or both, a correspondingly finer scanning can be effected. On the other hand, it is likewise possible to decrease the number of sweeps of the photocell per unit length of web during the measurement, depending on what degree of accuracy is required. Advantageously, however, a full-surface scanning can be avoided and in lieu thereof a statistical cross section accepted. In practice, traversing the photocell at a rate of 4 times per minute across a tire cord fabric moving continuously at a speed of 60 meters per minute, with an intermittent advance of the chart by approximately 5 millimeters at each photocell reversal, has produced charts of satisfactory detail and accuracy. The graph, which can be made either by the producer of the web or by the user, thus constitutes a documentary record of the web which can be permanently retained and, whenever necessary, referred to for a determination of the fitness of the web for its intended use.

The process of the present invention is, of course, readily adaptable to different practical situations which may be encountered. Thus, and merely by way of example, possibilities of adaptation lie in the adjustment of the intensity of the light stream emitted by the light source 14 relative to the absorption capacity of the filamentary material of which the strands constituting the web being tested are made, and the selection of a commercial photocell particularly suited for such a testing operation. The matching of the photocell to the light output is, in fact, necessary because different types of webs will absorb light differently, an effect which will be enhanced in particular when impregnated fabrics or webs are being tested and the different impregnants have different light absorption properties.

It will further be understood that the graph illustrated in FIG. 1 is a more or less idealized version of what will generally be obtained by the practice of the present invention. Thus, in view of the fact that no web 10 will have all the strands 11 thereof perfectly parallel and uniformly spaced at all points along its length and width, certain numbers of blips, basically similar to those designated 50b (albeit possibly inverted in some cases) generally will be found randomly distributed over the chart among the various trace sections 50. Such random blips, of course, do not evidence any systematic or relatively large scale fault in the web, and absent any other indication, they and the actual strand deviations represented thereby can be simply ignored in the evaluation of the web since the inspection is directed only to the discovery of faults which are so extensive as not to be tolerable in a web such as a tire cord fabric.

It will be apparent that the foregoing description of a preferred embodiment of the present invention is for purposes of illustration only, and that the various structural and operational features and process conditions herein disclosed are susceptible to a number of modifications and changes none of which entails any departure from the spirit and scope of the present invention as defined in the hereto appended claims.

Having thus described the invention, what I claim and desire to be protected by Letters Patent is:

1. The process of testing a web of sheet material which is composed of a plurality of relatively closely spaced side by side strands extending longitudinally of the web, such as weftless tire cord fabric or the like, for the presence of web density-varying defects such as deviations of the strands from predetermined normal spacings thereof, etc., comprising the steps of:

a. advancing the web in the longitudinal direction thereof along a path between a light source and a photoelectric transducer at an inspection station;

b. directing a narrow elongated beam of light from said light source against one surface of said web as the latter moves through said inspection station, with the light beam extending across the entire width of said web and being incident on said one surface thereof with substantially uniform intensity;

c. reciprocally traversing said transducer across the other surface of said web along a path aligned with said beam of light, with the photosensitive portion of said transducer facing said other surface of said web and having a field of view approximately several strands wide;

d. deriving first electrical signals corresponding to the instantaneous positions of said transducer, and utilizing said first signals for controlling the actuation of the marking stylus of a recorder having an elongated strip chart movable longitudinally in the abscissa direction so as to effect a reciprocal traversing movement of the stylus across said chart in the ordinate direction in synchronism with the traversing movement of said transducer;

e. deriving second electrical signals corresponding to the instantaneous intensity values of light transmitted through said web and sensed by said transducer during the traversing movements thereof;

f. integrating said second signals to eliminate the effects of single strands entering and leaving the field of view of said transducer, and utilizing the resultant output signals of the integrating means for controlling the actuation of the stylus so as to effect, during each traverse of the stylus, displacements of the latter in the abscissa direction in accordance with mean transmitted light intensity variations corresponding to abnormal density variations in said web; and g. concurrently with each reversal of the traversing movement of said transducer advancing said chart longitudinally in a stepwise manner for a predetermined short distance to shift the ordinate axis correspondingly in the abscissa direction;

whereby the resultant graph provides a pictorial representation of said web and graphically illustrates the quality thereof.

2. The process of claim 1, wherein the speed of traverse of said transducer and the speed of advance of sad web are adjusted with respect to one another to cause said web to be scanned in a zigzag pattern of a pitch insufficient for a full-surface inspection of said web but sufficient to provide a statistically accurate pictorial representation thereof.

3. Apparatus for testing a web of sheet material which is composed of a plurality of relatively closely spaced side by side strands extending longitudinally of the web, such as weftless tire cord fabric or the like, for the presence of web density-varying defects such as deviations of the strands from predetermined normal spacings thereof, etc., comprising:
   a. an elongated light source and a photoelectric transducer juxtaposed to one another on opposite sides of a path along which said web may be advanced, the photosensitive portion of said transducer facing said path and having a field of view approximately several strands wide, and said light source being constructed for directing toward said path a narrow elongated beam of light extending across the entire width of said path so as to be incident on one surface of said web with substantially uniform intensity as the web is advanced along said path;
   b. first drive means for reciprocally traversing said transducer across said path in alignment with said beam of light;
   c. a recorder having an elongated strip chart movable longitudinally in the abscissa direction and a marking stylus therefor, and including second drive means for said chart;
   d. first circuit means for deriving first electrical signals corresponding to the instantaneous positions of said transducer and for applying said first signals to said recorder to effect a reciprocal traversing movement of said stylus across said chart in the ordinate direction in synchronism with the traversing movement of said transducer;
   e. second circuit means for deriving second electrical signals corresponding to the instantaneous intensity values of light transmitted through said web and sensed by said transducer during the traversing movement thereof;
   f. third circuit means including an integrator for integrating said second signals to eliminate the effects of single strands entering and leaving the field of view of said transducer and for applying the resultant output signals of said integrator to said recorder to effect, during each traverse of said stylus, displacements of the latter in the abscissa direction in accordance with mean transmitted light intensity variations corresponding to abnormal density variations in said web; and
   g. fourth circuit means responsive to each arrival of said transducer at one or the other of the opposite ends of its traversing movement for actuating said first drive means to reverse the direction of movement of said transducer and for concurrently actuating said second drive means to advance said chart longitudinally in a stepwise manner for a predetermined short distance to shift the ordinate axis correspondingly in the abscissa direction thereof;

whereby the resultant graph provides a pictorial representation of said web and graphically illustrates the quality thereof.

4. Apparatus according to claim 3, further comprising a carriage supporting said transducer, guide track means mounting said carriage for movement across said path, transmission means interconnecting said first drive means and said carriage, and a pair of operating members each disposed adjacent a respective one of the opposite ends of said guide track means for sensing the arrival of said carriage at that end, said operating members controlling said fourth circuit means.

5. Apparatus according to claim 4, said first circuit means comprising a current-varying device mechanically coupled to said transmission means.

6. Apparatus according to claim 4, said fourth circuit means comprising control switch means, and said operating members comprising a pair of pivotal levers mechanically coupled to said control switch means and having respective abutment elements thereof engageable by corresponding abutment means connected with said carriage.